Sept. 2, 1969 E. H. SCHMIDT 3,465,307

ANISOTROPIC MAGNETIC THIN FILM MEMORY APPARATUS

Filed Oct. 8, 1964 2 Sheets-Sheet 1

INVENTOR.
EDWIN H. SCHMIDT
BY Charles J. Ungemach
ATTORNEY

ANISOTROPIC MAGNETIC THIN FILM MEMORY APPARATUS

Filed Oct. 8, 1964 2 Sheets-Sheet 2

INVENTOR.
EDWIN H. SCHMIDT
BY
Charles J. Ungemach
ATTORNEY

United States Patent Office 3,465,307

Patented Sept. 2, 1969

3,465,307

ANISOTROPIC MAGNETIC THIN FILM MEMORY APPARATUS

Edwin H. Schmidt, Minnetonka, Minn., assignor to Honeywell Inc., Minneapolis, Minn., a corporation of Delaware Filed Oct. 8, 1964, Ser. No. 402,575

Int. Cl. G11b 5/02

U.S. Cl. 340—174 10 Claims

ABSTRACT OF THE DISCLOSURE

A coding and readout device utilizing the orientation of the easy axes of magnetization of thin film elements to store coded information. Nondestructive readout techniques employ scanning transducers coupling an interrogating field to the thin film elements. The relative strength of induced output signals responsive to such interrogation indicate the orientation of easy axes.

This invention relates generally to coding apparatus and more specifically relates to a magnetic thin film coding and readout mechanism in which a plurality of magnetic thin film elements or spots are arranged in a predetermined code pattern that can be detected by a suitable readout transducer.

Magnetic thin films have been used extensively in computer and data processing applications in the past few years. A typical thin film consists of a deposition 1,000–10,000 Angstroms thick of Permalloy on a suitable substrate. Permalloy is approximately 80 percent nickel and 20 percent iron. These films can be deposited in continuous form over a large area or they may be deposited through a mask or etched from a continuous deposition in such a way that small elements or spots result. Thicker film and films of material other than Permalloy may also be used in this invention. Such thin films offer the advantage of increased switching speed, greater packing density, increased operating temperature range, and lower cost than conventional ferrite core systems.

The ferromagnetic thin films that are used in this invention exhibit uniaxial magnetic anisotropy, that is, they have different magnetic properties in different directions. The anisotropy of the films results in an easy and a hard direction of magnetization that are perpendicular to each other in the plane of the film. In the easy direction, a rectangular hysteresis loop exists, whereas in the hard direction a more linear B–H curve exists. The magnetic properties of a thin film element are considerably different when measured along the easy axis than when measured along the hard axis. It is this difference in magnetic properties that is utilized in this invention.

The direction of the easy axis of magnetization can be determined during the deposition of the magnetic material by heating the substrate and applying a static magnetic field parallel to the plane of the substrate. The magnetic field induces the easy axis of magnetization. Alternately, uniaxial anisotropy may be generated after the magnetic material has been deposited to form a thin film. The thin film may be heated and placed in the presence of a magnetic field to effect the same results. Regardless of how the anisotropy characteristics of the thin film elements are generated, such characteristics are an intrinsic property of the material. The material exhibiting anisotropy does not generate an external magnetic field and the characteristics are not influenced by temperature, shock, vibration, electromagnetic fields, dust, or other environmental conditions.

Prior art memory systems, in which thin magnetic films have been used, have utilized the oppositely oriented stable remanent directions of flux along the easy axis to store information. By the proper application of a magnetic field, the thin film element can be switched from one stable condition to the other along the easy axis. The opposite stable remanent states are designated the different binary values "zero" and "one." In such prior art memory systems, a plurality of wires or other conductors were required to write-interrogate-read the memory system. In such systems, a first wire is normally required to magnetize the element to the remanent state designating the desired binary value. A second wire is then required to interrogate the element, and a third wire is required to readout the stored information. Such systems are extremely complicated and yet provide only two bits of information per element.

The present invention, a magnetic thin film coding and readout mechanism, is intended for use in such applications as static card readers, programmers, comparators, sequencers, security information storage, or timers in which semi-permanent storage is a requirement. It is not intended for use in those systems in which the information being stored is constantly being changed, therefore, the complicated wiring arrangements of the prior art can be eliminated.

According to the present invention, one or more magnetic thin film elements or spots are deposited or otherwise affixed to a suitable support member, carrier member, information storage member, or substrate with the hard versus easy axis of magnetization being used to establish a code pattern. A binary value of "one" can be designated by orienting the easy axis in a first direction with respect to the support member. A binary value of "zero" can be designated by orienting the easy axis in a second direction perpendicular to the first direction, both directions being in the same plane. If a plurality of elements are used to establish a code pattern, a first group of the elements will have the easy axis aligned in the first direction while a second group of the elements will have the easy axis aligned in the second direction perpendicular thereto. A suitable readout means is then provided to detect the orientation of the elements as a means of decoding the pattern.

Perhaps the best vehicle for explaining the many advantages of this invention is the high security identification card system that can be devised using the invention. Many governmental and civilian installations today require that all employees carry an identification card. Such employees are not allowed access to such installations unless they can present their individual identification card. It is obvious that the degree of security obtained by the use of such cards is limited by the security of the cards themselves. If such cards can be easily counterfeited, it is a relatively simple matter for one not an employee to gain access to the installation. If, however, a code pattern on the card exhibits a high resistance to conventional decoding and code simulation techniques, it becomes infinitely more difficult for one not an employee to gain access to such installations.

The present invention provides a means of establishing just such a code pattern on an employee identification card. A plurality of thin film elements would be placed on the card with the easy axis aligned in either the first direction or the second direction to establish a code pattern. Such information as the employee's name, address, security clearance, and job classification could easily be included in the code. Since the anisotropic characteristics of the elements are an intrinsic property, the resulting code pattern would exhibit a high resistance to decoding and code simulation techniques because all of the elements would appear identical to visual inspection, X-ray inspection, or chemical analysis. It would be extremely difficult for a counterfeiter to determine the coding technique and even if the technique were known, it would be difficult to break the code.

It can be seen that the present invention will provide an identification card that is superior to cards employing conventional techniques such as punched holes, raised spots, or the presence or absence of magnetic spots. Further, such a card can be easily mass produced since the code pattern is established by heating the elements and applying a magnetic field after the card itself is manufactured. The magnetic thin film elements placed on the cards during the manufacturing process would not possess anisotropy characteristics. This characteristic would be added at a later time to form the desired code. The code, once established, could be retained indefinitely or it could be changed easily by changing the orientation of the easy and hard axes of magnetization.

The readout mechanism that is part of this invention will sense the orientation of the spots on the card to decode the pattern. A magnetic transducer is employed that consists of a core having an input winding and an output winding thereon. A sinusoidal or other pulsating current is applied to a primary winding on the core to generate a reversing magnetic field in the neighborhood of the thin film element being decoded. The reversing magnetic field inductively couples the core to the element and causes the element to rapidly switch between saturation states along the axis that lies in parallel with the magnetic field. As the film is switched from one saturation state to the other, a flux change occurs that generates a signal in the output winding. A large output is generated when the film is oriented with the easy axis parallel to the applied field, and a relatively smaller output exists when the film is oriented with the easy axis perpendicular to the applied field. Therefore, the thin film orientation representing either a code "one" or a code "zero" is sensed from each element of the code pattern.

It is therefore a primary object of the present invention to provide a magnetic thin film coding and readout mechanism in which the hard versus easy axis of magnetization of the thin film elements is used as a means of coding.

Further objects of the invention will be apparent from the following description when considered in conjunction with the accompanying drawings in which.

Figure 4:
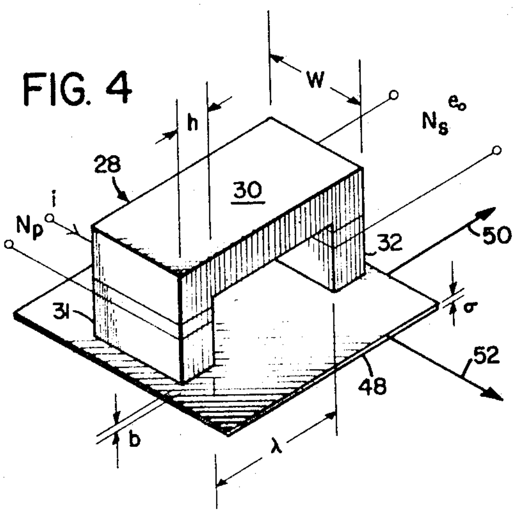
FIGURE 4 is a representation of a typical readout device used to detect the orientation of the axes of the thin film element.
Figure 5:
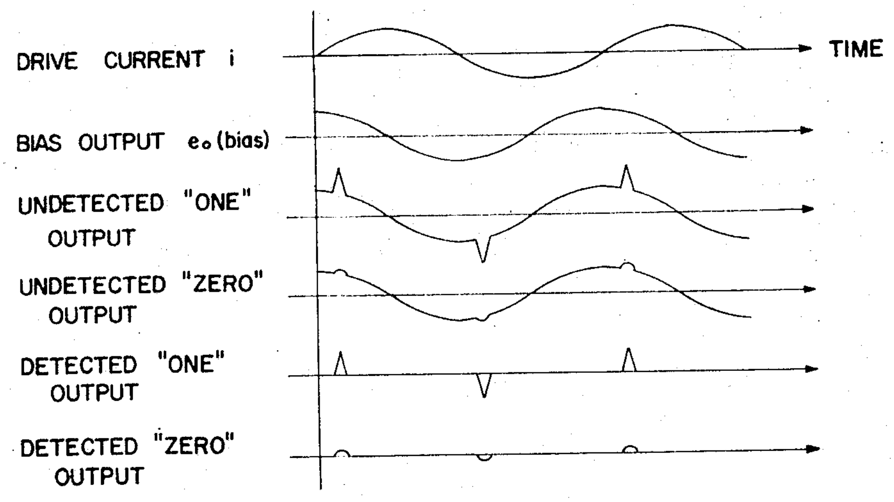
Figure 6:
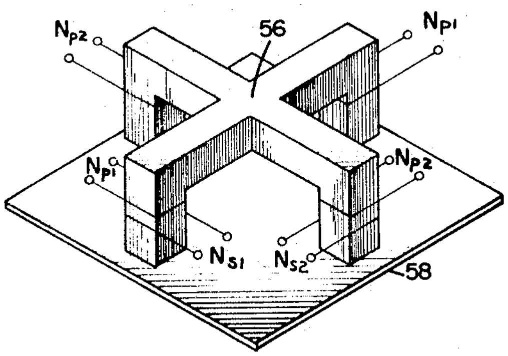

FIGURE 5 discloses typical output waveforms from the readout device disclosed in FIGURE 4; and FIGURE 6 discloses a four pole magnetic transducer or magnetic readout device.

Figure 1:
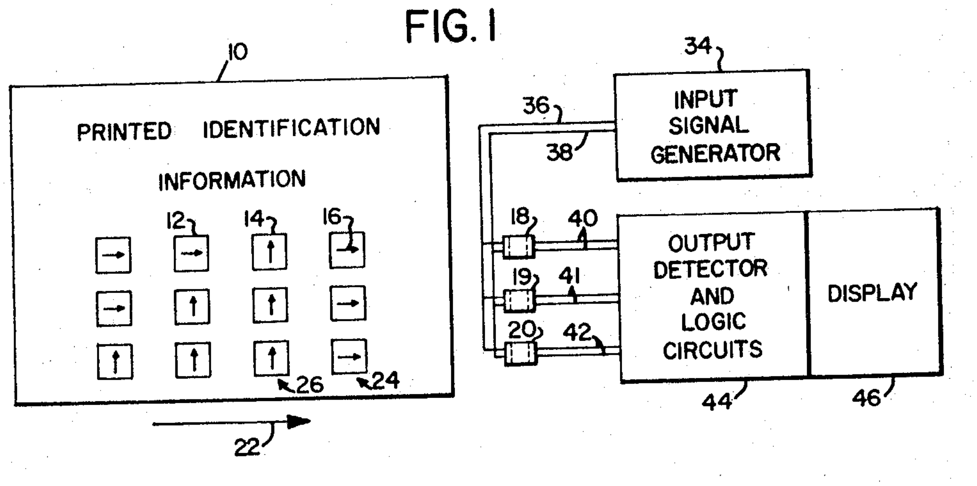
FIGURE 1 is a schematic representation of an identification card utilizing this invention together with a readout device for detecting and displaying the code carried by the card.

Referring now to the drawings, there is disclosed in FIGURE 1 a rectangular card 10 having a plurality of thin film magnetic elements such as 12 and 14 mounted thereon. Card 10 is a rigid mounting member or substrate manufactured from a metal such as copper or from a plastic material. Card 10 could also be laminated with the magnetic elements hidden from visual observation between the layers of card 10. In this schematic representation, the top portion of card 10 is reserved for visual identification information such as an employee name or picture. Mounted within the lower portion of card 10 are twelve magnetic elements having the easy axis of magnetization oriented as disclosed by arrow 16, for example. The magnetic elements in FIGURE 1 are depicted as being square in shape. The elements could as well be circular or rectangular without affecting the operation of the system. Element 12 and several other elements have the easy axis of magnetization oriented in a first direction with respect to card 10. Element 14 and a second group of similar elements have their easy axis of magnetization oriented in a second direction perpendicular to the first direction.

Also disclosed in FIGURE 1 is a schematic representation of a readout system for the code pattern, A plurality of readout devices 18, 19, and 20 are mounted a distance apart corresponding to the positioning of the magnetic elements on card 10. Card 10 would be placed beneath readout devices 18, 19 and 20 by moving card 10 in a direction disclosed by arrow 22. The row of elements 24 would first pass beneath devices 18, 19 and 20 to decode the information carried by the elements. The card then would be moved further so that the row of elements 26 would next fall beneath the readout devices. In this manner the four rows of magnetic thin film elements would be sequentially decoded.

As disclosed in FIGURE 4, each readout deivce such as 18 comprises a core member 28 having a longitudinal portion 30 and a pair of legs 31 and 32. A primary winding, $N_p$, is wrapped around leg 31 while a secondary or output winding, $N_s$, is wrapped around leg 32.

Referring again to FIGURE 1, the primary or input winding of each readout device is connected in parallel to an input signal generator 34 by a pair of wires 36 and 38. The devices 18, 19 and 20 could also be connected in series. In the preferred embodiment, generator 34 produces a sinusoidal current that is impressed on the primary windings of devices 18, 19 and 20. The output winding, $N_s$, of each readout device 18, 19 and 20 is connected by a pair of wires as 40, 41, and 42 to an output detector and logic circuit 44. The output from each secondary or output winding, $N_s$ would be compared by circuit 44 to a preestablished code pattern. Circuit 44 could also be a computer that would recognize a large variety of patterns. The information obtained by circuit 44 would be displayed on a suitable display device 46.

The magnetic fields generated by devices 18, 19 and 20 would lie parallel to the arrows 16 or easy axis of magnetization of row 24. With the easy axis and the magnetic field in parallel, a relatively large output representing a binary "one" would be received from the readout devices. When row 26 is placed beneath the readout devices, the easy axis of magnetization is perpendicular to the applied magnetic field. In that case a much smaller output would be generated, representing a binary "zero."

Referring again to FIGURE 4, the readout device or magnetic transducer is shown mounted adjacent to a magnetic thin film element 48 having an easy direction of magnetization represented by arrow 50 and a hard direction of magnetization represented by arrow 52. Legs 31 and 32 of the transducer are separated from element 48 by an air gap $b$. When a current $i$ is introduced into primary winding $N_p$, a magnetic field is generated in parallel with easy axis 50 that inductively couples core 28 to element 48 through air gap $b$.

Figure 2:
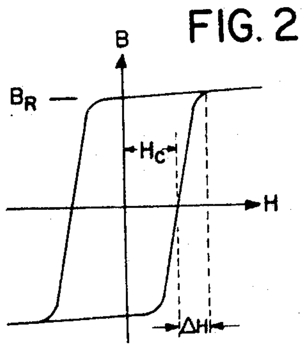
FIGURE 2 is a rectangular hysteresis loop that is characteristic of the magnetic properties of the anisotropic thin film material along the easy axis.

The output signal from winding $N_s$ is of a different magnitude depending on whether the easy axis is parallel with or perpendicular to the applied magnetic field. This difference in output is due to the difference in magnetic properties of the material along the easy axis as compared to the hard axis. FIGURE 2 discloses a relatively rectangular hysteresis loop that is representative of the magnetic properties of the thin film element along the easy axis of magnetization. As will be understood by those skilled in the art, H represents the applied magnetic field, B represents the flux density, $B_r$ represents the residual flux density, $H_c$ represents coercivity, and $\Delta H$ represents the difference between the coercivity $H_c$ and the threshold magnetic field required to switch the element. For the easy axis of magnetization, a relatively small change in the magnetic field applied along axis H causes a large change in flux density along axis B. This large change in flux density as the element is switched between the two stable remanence conditions causes a large output from windings $N_s$.

Figure 3:
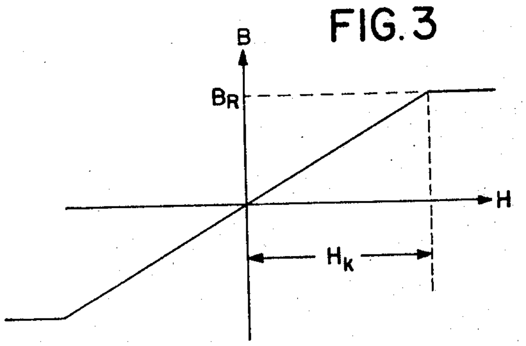
FIGURE 3 is a linear B–H curve that is representative of the magnetic properties of the thin film material along the hard axis.

FIGURE 3 discloses a linear BH curve that is representative of the magnetic properties of the thin film element along the hard axis. $H_k$ corresponds to $H_c$ in FIGURE 2 and represents the hard direction saturation field intensity. $H_k$ is generally much greater than $H_c$. In FIGURE 3 it can be seen that with a steadily increasing magnetic field intensity along axis H, there is only a gradual increase in flux density along axis B. There is no sharp change in flux density with a change in magnetic field intensity. Thus a relatively small output is obtained from output windings $N_s$ when the thin film element saturates along the hard axis.

In FIGURE 5 the current waveforms associated with the readout device disclosed in FIGURE 4 are presented. The amplitude of the current is plotted with respect to time. Drive current $i$ is a sinusoidal wave that is applied to primary winding $N_p$ by input signal general 34 in FIGURE 1. As the current rises to a positive value and then declines to zero, a magnetic field will be generated through the magnetic element adjacent the readout device. As the current goes to a negative value and again returns to zero the magnetic field will be reversed but will lie in the same direction as the first magnetic field. A periodically reversing magnetic field is thus established through the thin film element to drive the element from one remanent or saturation state to the other. The undetected "one" output represents the output from secondary winding $N_s$ when the magnetic field is parallel to the easy axis of magnetization. The undetected "zero" output represents the signal derived from winding $N_s$ when the magnetic field perpendicular to the easy axis. The detected "one" output and the detected "zero" output are the usable peak output signal voltages that are obtained when the bias voltage $E_0$ is removed by a frequency sensitive detector, by a bucking winding, or by a level detector. The circuitry for detcting and removing the output bias voltage is contained in block 44 in FIGURE 1. The logic circuitry necessary for discriminating between the detected "one" output and the detected "zero" output would also be contained in block 44. Because of the relatively large difference in amplitude between the "one" and the "zero" outputs, the system is highly accurate and reliable.

The readout device discolsed in FIGURE 6 is a four-pole magnetic transducer that can be considered as two separate two-pole units that are perpendicular to each other. The transducer again consists of a core 56 having a plurality of input and output windings thereon. Core 56 is mounted above a magnetic thin film element 58. The two primary windings labeled $N_{p1}$ are connected in series aiding on one core so that proper focusing is obtained. Similarly, the input windings labeled $N_{p2}$ are connected on the other core in series aiding. The output from one portion of the core is taken from output winding $N_{s1}$ while the output from the perpendicular portion of the core is taken from output winding $N_{s2}$. When this four-pole transducer is used, one of the core members will always lie in parallel with the easy axis while the other core member will lie perpendicular to the easy axis. To interrogate thin film element 58, a sinusoidal or other periodically varying wave is first impressed on primary windings $N_{p1}$, That portion of the core is energized until a usable output is received from output winding $N_{s1}$. The perpendicular portion of the core is then energized through input windings $N_{p2}$ to produce a magnetic field perpendicular to the first magnetic field. This sinusoidal input wave is continued until a usable output is received from secondary winding $N_{s2}$. This type of four-pole sensor is especially useful where a high resistance to code simulation is required. First of all, the transducer will quickly discriminate between a ferrous and a nonferrous material. If a nonferrous element is placed beneath the four-pole transducer, no output will be achieved from either winding. If an isotropic ferrous material is placed beneath the transducer, equal signals will be obtained from each of the output windings, thus indicating that there is no easy versus hard axis of magnetization. If, however, an anisotropic thin film element is placed beneath the transducer, a high output will be achieved from the core that is parallel with the easy axis while a smaller output will be achieved from the core that is perpendicular to the easy axis. Any attempt to simulate the code pattern by using the absence or presence of a ferrous material, or the absence or presence of an anisotropic material could easily be detected by the four-pole transduced. Table I below discloses the output voltages on the two secondary windings, the code represented by the output, and the material corresponding to the code.

TABLE I.—OUTPUT LOGIC FOR FOUR-POLE TRANSDUCER

| Voltage on $N_{s1}$: | Voltage on $N_{s2}$ | Code | Code material |
|---|---|---|---|
| 0 | 1 | 1 | Anisotropic. |
| 1 | 0 | 0 | Do. |
| 1 | 1 | (1) | Ferrous. |
| 0 | 0 | (1) | Non-ferrous. |

[1] Reject.

The theoretical explanation of the operation of the invention is as follows:

The primary winding in FIGURE 4, $N_p$, is driven by a sinusoidal current source such that $$i = I \sin 2\pi ft \quad (1)$$

The coupling that exists between the primary and secondary windings results in a sinusoidal output bias voltage, $E_0$ (bias), at all times. The total peak output voltage, $E_0$ (zero), developed across the secondary when the magnetic film is present and oriented with the hard direction parallel to the applied field is given by $$E_0(\text{zero}) = E_0(\text{bias}) + \Delta E_0(\text{zero} \quad (2)$$

Similarly, the total peak output voltage, $E_0$ (one), developed across the secondary when the magnetic film is present and oriented in the easy direction is given by $$E_0(\text{one}) = E_0(\text{bias}) + \Delta E_0(\text{one}) \quad (3)$$

The bias voltage $E_0$ (bias) may be removed by a frequency sensitive detector or a level detector. Therefore, $\Delta E_0$ (one) and $\Delta E_0$ (zero) are the usable peak output signal voltages resulting from the easy and hard directions respectively. FIGURE 5 shows the typical transducer outputs.

The theoretical equations for the usable outputs as a function of the core and circuit parameters given in FIGURES 2, 3 and 4 are obtained by use of conventional magnetic circuit analysis.

$$\Delta E_0(\text{one}) \simeq \frac{kN_pN_sB_rW\sigma If}{\Delta H\lambda} \quad (4)$$

$$\Delta E_0(\text{zero}) \simeq \frac{kN_pN_sB_rW\sigma If}{H_k\lambda} \quad (5)$$

$$\frac{\Delta E_0(\text{one})}{\Delta E_0(\text{zero})} \simeq \frac{H_k}{\Delta H} \quad (6)$$

Therefore, it is seen that $\Delta E_0$ (one) is directly proportional to the:

(1) Turn product, $N_sN_p$,
(2) Flux density, $B_r$
(3) Transducer width, W,
(4) Film thickness, $\sigma$,
(5) Peak excitation current, I,
(6) Excitation frequency, $f$.

It is also seen that $\Delta E_0$ (one) increases as $\Delta H$ and $\lambda$ decrease. However, the effect of $\Delta H$ may be somewhat limited due to switching time and coercivity. Equation 6 shows that the ratio between easy and hard direction outputs is directly proportional to $H_k$ and inversely proportional to $\Delta H$. Therefore, a high anisotropy is desirable so that $H_k/H_c$ is large as possible.

It should be noted that Equations 4 and 5 were developed without consideration for the spacing $b$ between the transducer and the magnetic film. The relationships between the output voltage and the spacing would be such that the output voltage decreases as the spacing increases. The reduction of the field intensity as a function of distance from the transducer pole pieces results in the reduced output.

A "one" output of approximately 0.10 volt peak and a "zero" output of 0.005 volt was obtained using a chemically deposited thin film material with the following circuit values:

$N_s=N_p=100$ turns,
$I=0.10$ amp,
$f=16,000$ c.p.s.,
$b=1/32$ inch,
$\sigma=50\times10^{-6}$ inches,
$W\simeq0.080$ inch,
$h\simeq0.125$ inch,
$H_k=22$ oersteds,
$H_c=2.2$ oersteds,
$B_r\simeq6000$ gauss,
$\lambda\simeq3/8$ inch.

The magnetic thin film coding and readout mechanism that I have invented has the advantages of low power consumption, high resistance to decoding and code simulation, system and circuit simplicity, high sensitivity, immunity to enviromental conditions, and high reliability. While I have shown and described a preferred embodiment of this invention, further modification and improvements will occur to those skilled in the art. I desire it to be understood therefore that this invention is not limited to the particular form shown and described.

I claim:

1. A magnetic thin film coding and readout device, comprising: a flat support member; a plurality of magnetic thin film elements deposited on one side of said support member in a prearranged pattern; each of said elements being a thin film of ferromagnetic material exhibiting an easy axis of magnetization in the plane of said film and a hard axis of magnetization perpendicular thereto in said plane; said elements exhibiting rectangular hysteresis loop characteristics along said easy axis and linear hysteresis loop characteristics along said hard axis; a first group of said elements having said easy axis oriented in a first direction with respect to said support member, and a second group of said elements having said hard axis oriented in said first direction; a magnetic transducer for mounting in proximity to said support member to detect individually the orientation of said elements; said transducer comprising a core, an input winding on said core and an output winding on said core; and means for energizing said input winding to generate a magnetic field to inductively couple said core to said element; said magnetic field causing said element to switch remanent or saturation states to induce an output on said output winding; said output being larger when said magnetic field is parallel to said easy axis than when they are perpendicular.

2. A magnetic thin film coding and readout device, comprising: a support member; a plurality of magnetic thin film elements mounted thereon in a prearranged pattern; said elements having permanent uniaxial anisotropy defining a single easy axis of magnetization in the plane of said film and a hard axis of magnetization perpendicular thereto in said plane; each of said elements in said pattern having said easy axis aligned either in a first direction with respect to said support member or in a second direction perpendicular thereto to thereby define a prearranged code; and a readout device for mounting in close proximity to said elements to determine the alignment of the easy axis of said elements.

3. A magnetic thin film coding and readout device, comprising: a support member; a plurality of magnetic thin film elements deposited on said support member in a prearranged pattern; each of said elements being a thin film of ferromagnetic material exhibiting an easy axis of magnetization perpendicular thereto in said plane; a first group of said elements having said easy axis aligned in a first direction with respect to said support member, and a second group of said elements having said hard axis aligned in said first direction; and a readout device for mounting adjacent said support member to decipher said code pattern; said readout device including energized input means, a core, and output means; said input means generating a magnetic field in said first direction for inductively coupling said core to said element when said readout device and one of said elements are in close proximity to each other; said output means producing a larger signal when said magnetic field and said easy axis are parallel then when they are perpendicular.

4. In a high security magnetic thin film identification system, a plurality of anisotropic magnetic thin film elements mounted on an information storage member with the easy axis of magnetization permanently oriented in either a first direction or a second direction generally perpendicular thereto to establish a preselected code pattern; readout means for interrogating said code pattern by interrogating individual elements to determine the orientation of said easy axis of the element being interrogated; said readout means comprising means for generating a magnetic field through said element in said first direction to cause said element to switch saturation states and thereby exhibit a change in flux density; and means for detecting the change in flux density to discriminate between an element having said easy axis parallel to said magnetic field and an element having said easy axis perpendicular to said magnetic field.

5. A magnetic data storage and readout mechanism, comprising: a carrier member; at least one magnetic thin film element deposited on said carrier member; said element being characterized by exhibiting uniaxial anisotropy causing a single easy axis of magnetization in the plane of said film and a hard axis of magnetization perpendicular thereto in said plane; said element being capable of assuming two stable remanence condition along said easy axis and two opposite saturation conditions along said hard axis; the time rate of flux change during a switch between said two conditions along said easy axis being greater than the time rate of flux change during a switch along said hard axis; said element having said easy axis oriented in either a preselected first direction or in a second direction perpendicular thereto, with respect to said carrier member, to code said member; a magnetic transducer for mounting in close proximity to said element to detect the orientation of said easy axis with respect to the orientation of said transducer; said transducer comprising a core having an input winding and an output winding thereon; and means for impressing a varying current in said input winding to generate a periodically reversing magnetic field in said first direction to inductively couple said core to said element and cause said element to switch remanent or saturation conditions thereby including a signal in said output winding; said signal having a greater amplitude because of the greater time rate of change of flux when said magnetic field and said easy axis are parallel then when they are perpendicular with respect to each other.

6. A magnetic thin film coding and readout device, comprising: a support member; at least one magnetic thin film element deposited thereon; said element exhibiting uniaxial anisotropy characterized by mutually perpendicular easy and hard axes of magnetization in the plane of said film; said element having first and second remanent magnetic states with respect to each of said axes; said element having said easy axis aligned in either a first direction or a second direction perpendicular thereto, with respect to said support member, to code said member; a magnetic transducer for mounting in close proximity to said element to detect the orientation of said easy axis; said transducer comprising a core having input and output windings thereon; and means for applying a pulsating current to said input winding to generate a periodically reversing magnetic field lying in said first direction to inductively couple said core to said element; said magnetic field switching said element from one saturation state to the opposite saturation state to produce a signal from said output winding; the amplitude of said signal being greater when said magnetic field and said easy axis are parallel than when they are perpendicular with respect to each other.

7. A magnetic thin film coding and readout device, comprising: a substrate member; at least one magnetic thin film element mounted thereon; said element exhibiting uniaxial anisotropy whereby mutually perpendicular hard and easy axes of magnetization lie in the plane of said thin film element; a readout device for mounting in close proximity to said element to detect the orientation of said axes of said element on said substrate; said readout device including a core member with input and output windings thereon; and means for impressing a first signal on said input winding to generate a magnetic field to inductively couple said core member and said element; said magnetic field causing said element to switch saturation states to generate a second signal on said output winding; said second signal having a greater amplitude when said magnetic field and said easy axis are parallel than when they are perpendicular.

8. A coding and readout device, comprising: a support member; at least one thin film element mounted thereon; said element exhibiting permanent uniaxial anisotropy whereby mutually perpendicular hard and easy axes of magnetization lie in the plane of said thin film element; means for generating a magnetic field through said element; and means for detecting the orientation of said element with respect to the orientation of said magnetic field.

9. A magnetic thin film coding and readout device, comprising: a support member; a plurality of magnetic thin film elements deposited on said support member in a pre-arranged pattern; each of said elements being a thin film of ferromagnetic material exhibiting an easy axis of magnetization in the plane of said film and a hard axis of magnetization perpendicular thereto in said plane; said elements exhibiting rectangular hysteresis loop characteristics along said easy axis and linear hysteresis loop characteristics along said hard axis; a first group of said elements having said easy axis oriented in a first direction with respect to said support member and a second group of said elements having said hard axis oriented in said first direction; a magnetic transducer for mounting in close proximity to said elements to detect individually the orientation of said easy axis and to discriminate between materials having and not having anisotropic characteristics;

said transducer comprising a first core member having input and output windings and a second core member having input and output windings; said first and second core members being mounted in said transducer at right angles to each other; means for providing a periodically varying current flow through said input windings so that a first periodically reversing magnetic field is generated along said first direction and a second periodically reversing magnetic field is generated along said second direction to inductively couple said cores to said element being decoded; said first and second magnetic fields switching said elements between alternate saturation conditions to induce a voltage in said output windings; the voltage from said output windings on said first core member being of greater magnitude than the voltage induced in said output winding on said second core member when said element has anisotropic characteristics; the voltage on said output windings being equal when said element does not have anisotropic characteristics; and means for indicating the output from said output windings.

10. In a high security magnetic thin film identification system; a plurality of anisotropic magnetic thin film elements mounted on an information storage member with the easy axis of magnetization oriented in either a first direction or a second direction generally perpendicular thereto to establish a preselected code pattern; readout means for interrogating said code pattern by interrogating individual elements to distinguish between an element having anisotropy and an element not having anisotropy, to detect the presence or absence of an element in a particular spot on said storage member, and to determine the orientation of said easy axis of the element being interrogated; said readout means comprising means for generating a first magnetic field through said element in said first direction to cause said element to switch saturation states and thereby exhibit a first change in flux density; means for generating a second magnetic field through said element in said second direction to cause said element to switch saturation states along the other axis and thereby exhibit a second change in flux density; means for detecting said first and second changes in flux density; and means for comparing the changes in flux density to decode said storage member.

References Cited

UNITED STATES PATENTS

| | | | |
|---|---|---|---|
| 3,015,087 | 12/1961 | O'Gorman | 340—149 |
| 3,100,834 | 8/1963 | Demer | 235—61.12 |
| 3,312,372 | 4/1967 | Cooper | 235—61.11 X |
| 3,174,138 | 3/1965 | Matcovich et al. | 340—174 |

OTHER REFERENCES

Russell, L. A.: "Non-Destructive Read For Thin Film Storage Device," IBM TDB, vol. 3, No. 6, November 1960, p. 56.

BERNARD KONICK, Primary Examiner

J. F. BREIMAYER, Assistant Examiner

U.S. Cl. X.R.

235—61.12